United States Patent
Hiramatsu et al.

(10) Patent No.: US 6,628,959 B1
(45) Date of Patent: Sep. 30, 2003

(54) BASE STATION AND METHOD OF TRANSMISSION POWER CONTROL

(75) Inventors: Katsuhiko Hiramatsu, Yokosuka (JP); Kazuyuki Miya, Kawasaki (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 09/600,285

(22) PCT Filed: Nov. 22, 1999

(86) PCT No.: PCT/JP99/06499

§ 371 (c)(1),
(2), (4) Date: Jul. 14, 2000

(87) PCT Pub. No.: WO00/31999

PCT Pub. Date: Jun. 2, 2000

(30) Foreign Application Priority Data

Nov. 26, 1998 (JP) .......................................... 10-336110

(51) Int. Cl.[7] ................................................. H04B 7/00

(52) U.S. Cl. ......................................... 455/522; 455/70

(58) Field of Search .............................. 455/456, 69, 70, 455/522, 103, 13.4, 504; 342/457.1, 357.1, 357.17; 370/318

(56) References Cited

U.S. PATENT DOCUMENTS

| | | | | |
|---|---|---|---|---|
| 5,293,642 A | * | 3/1994 | Lo ............................ | 455/456 |
| 5,615,409 A | * | 3/1997 | Forssen et al. ............ | 455/440 |
| 5,924,040 A | * | 7/1999 | Trompower ................ | 455/456 |
| 6,163,696 A | * | 12/2000 | Bi et al. ................... | 455/436 |
| 6,477,380 B1 | * | 11/2002 | Uehara et al. ............ | 455/456 |
| 6,490,460 B1 | * | 12/2002 | Soliman .................... | 455/522 |

FOREIGN PATENT DOCUMENTS

| | | |
|---|---|---|
| EP | 0823793 | 2/1998 |
| JP | 8019035 | 1/1996 |

* cited by examiner

*Primary Examiner*—Charles Appiah
(74) *Attorney, Agent, or Firm*—Stevens, Davis, Miller & Mosher, LLP

(57) ABSTRACT

If position detection is performed correctly, connection switch 161 is connected through a control signal and transmit power control circuit 162 carries out transmit power control based on reception power of a signal combining direct wave signals and delay wave signals. If position detection is not performed correctly, connection switch 161 is disconnected through a control signal and transmit power control circuit 162 performs transmit power control only based on reception power of the direct wave signals. Thus, it is possible to make reliable position detection compatible with reduction of interference in reception processing of signals of other stations.

3 Claims, 3 Drawing Sheets

BASE STATION AND METHOD OF TRANSMISSION POWER CONTROL

TECHNICAL FIELD

The present invention relates to a base station apparatus having a function of detecting the position of a terminal apparatus in communication and its transmit power control method used in a radio communication system.

BACKGROUND ART

A method of detecting the position of a terminal apparatus in communication by a base station apparatus in a radio communication system is disclosed in "Requirements and Objectives for 3G Mobile Services and System (ARIB) 1998.7.21", etc.

FIG. 1 is a system diagram showing a radio communication system including a base station apparatus having a position detection function.

When base station apparatus (BS) 1 detects the position of terminal apparatus (MS) 2 carrying out a radio communication, detects direction angle θ of terminal apparatus 2 between the direction of arrival of a reception signal and the base station taking advantage of array antenna characteristics. This method of detecting the direction of the terminal apparatus is disclosed in the "Introductory Course for Adaptive Signal Processing Technology Using Array Antenna and High Resolution Arriving Wave Estimations", etc.

After detecting direction angle θ of terminal apparatus 2 formed with the own station, base station apparatus 1 measures the distance between the own station and terminal apparatus 2. The method of measuring distance L between base station apparatus 1 and terminal apparatus 2 will be explained below using a slot timing chart in FIG. 2.

It takes propagation delay τ for a downlink signal sent from base station apparatus 1 to arrive at terminal apparatus 2. Likewise, it takes propagation delay τ for an uplink signal sent from terminal apparatus 2 to arrive at base station apparatus 1. Furthermore, it takes apparatus delay δ after terminal apparatus 2 completes reception of the downlink signal until it starts to send the uplink signal. This apparatus delay δ is generated due to delays in processing of the components of the apparatus and timing jitter, etc.

As shown in FIG. 2, slot length S and apparatus delay δ are known to base station apparatus 1, and therefore by measuring time T after starting to transmit the downlink signal to terminal apparatus 2 until base station apparatus 1 starts to receive the uplink signal sent from terminal apparatus 2, it is possible to calculate propagation delay τ from expression (1) below:

$$\tau = (T - S - \delta)/2 \quad (1)$$

Then, base station apparatus 1 can calculate distance L between the own station and terminal apparatus 2 from expression (2) below, where C is the velocity of light:

$$L = \tau \times C \quad (2)$$

Here, since expression (1) above only applies to a direct wave, it is only a direct wave that is used for position detection.

In contrast, if the system uses a communication system with high resolution with respect to a delay wave such as CDMA system, each apparatus improves its reception quality by carrying out RAKE combination that combines reception signals, which are direct and delay waves arriving at different times. Moreover, each apparatus performs transmit power control to reduce interference in reception processing from other stations while maintaining its desired reception quality.

That is, the conventional base station apparatus always performs transmit power control based on a power value of a signal resulting from RAKE combination of direct waves and delay waves, and so reception power of a direct wave is relatively small, resulting in a problem of failing to detect the position of the target terminal apparatus.

Moreover, if the base station apparatus performs control during position detection so that the terminal apparatus simply increases transmit power, interference in the reception processing of signals by other stations increases, making it impossible to attain the desired reception quality. That is, it is desirable to reduce transmit power of each terminal apparatus to a necessary minimum in consideration of the system as a whole.

DISCLOSURE OF INVENTION

It is an object of the present invention to provide a base station apparatus and transmit power control method capable of making reliable position detection compatible with reduction of interference in reception processing of signals from other stations.

The present invention attains the above object by carrying out transmit power control based on reception power of a signal combining direct wave and delay wave signals if position detection is correctly performed, and carrying out transmit power control only based on reception power of the direct wave signal if position detection is not correctly performed.

BEST MODE FOR CARRYING OUT THE INVENTION

With reference now to the attached drawings, an embodiment of the present invention will be explained in detail below.

Figure 1:
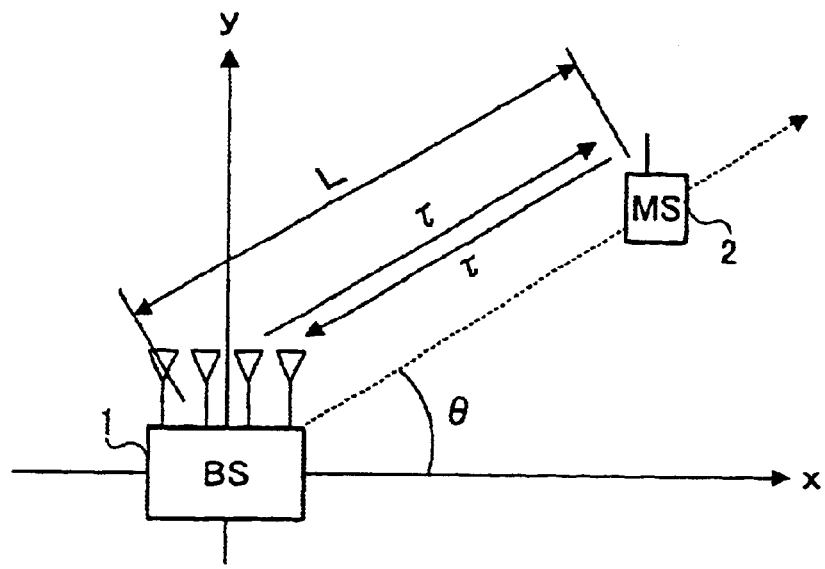
FIG. 1 is a system diagram showing a radio communication system including a base station apparatus having a position detection function.
Figure 2:
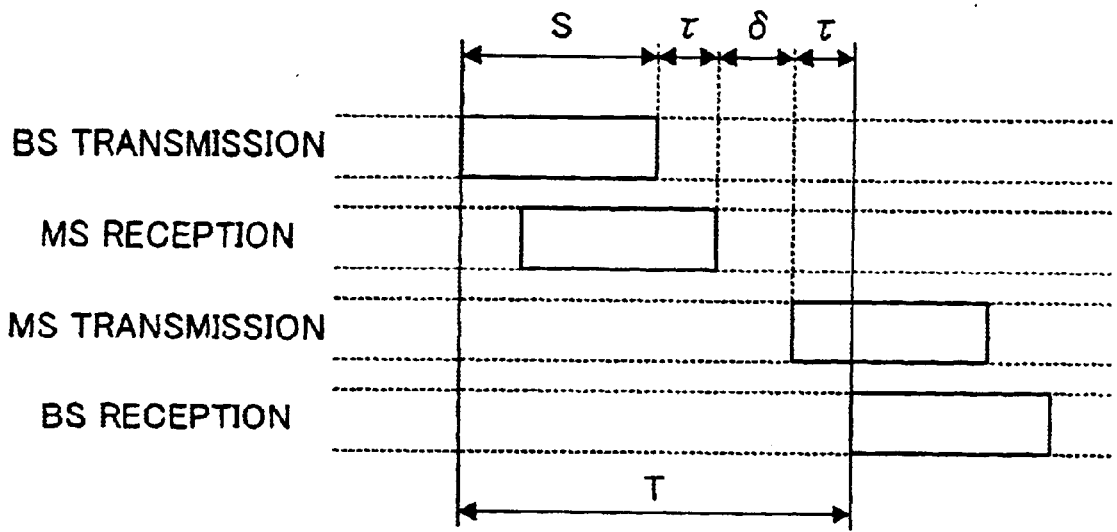
FIG. 2 is a drawing showing slot timing between a base station apparatus and terminal apparatus.
Figure 3:
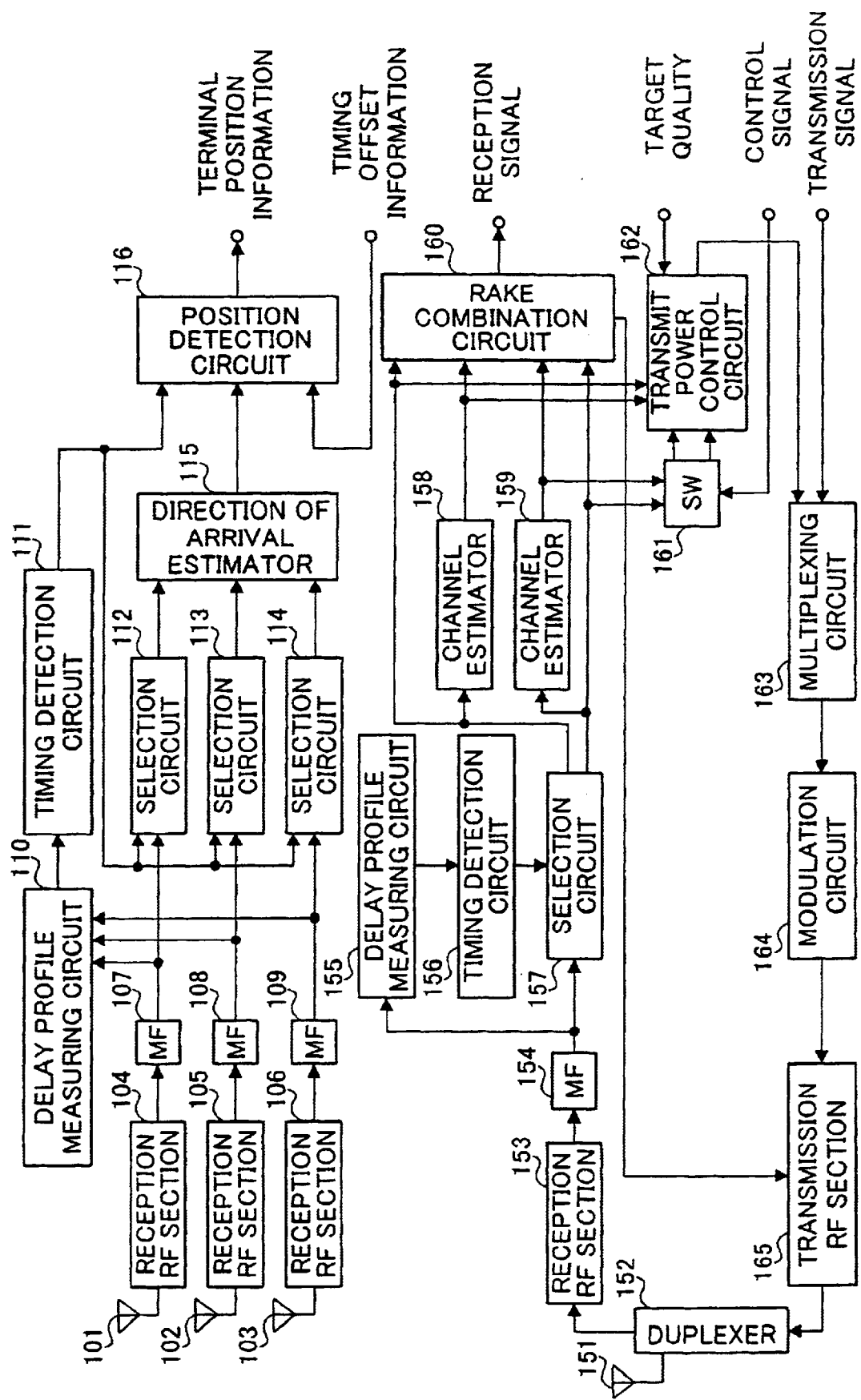
FIG. 3 is a block diagram showing a configuration of a base station apparatus according to an embodiment of the present invention.

FIG. 3 is a block diagram showing a configuration of a base station apparatus according to an embodiment of the present invention.

In FIG. 3, reception RF sections 104 to 106 amplify their respective signals received by antennas 101 to 103, convert their frequency to an intermediate frequency or baseband frequency and output the signals to matched filters 107 to 109. Matched filters 107 to 109 perform despreading on the output signals from reception RF sections 104 to 107 by their specific spreading codes and output the resulting signals to delay profile measuring circuit 110 and selection circuits 111 to 113.

Delay profile measuring circuit 110 measures delay profiles (reception power at a predetermined time) of matched filters 107 to 109 and outputs the measurement result to timing detection circuit 111.

Figure 4:
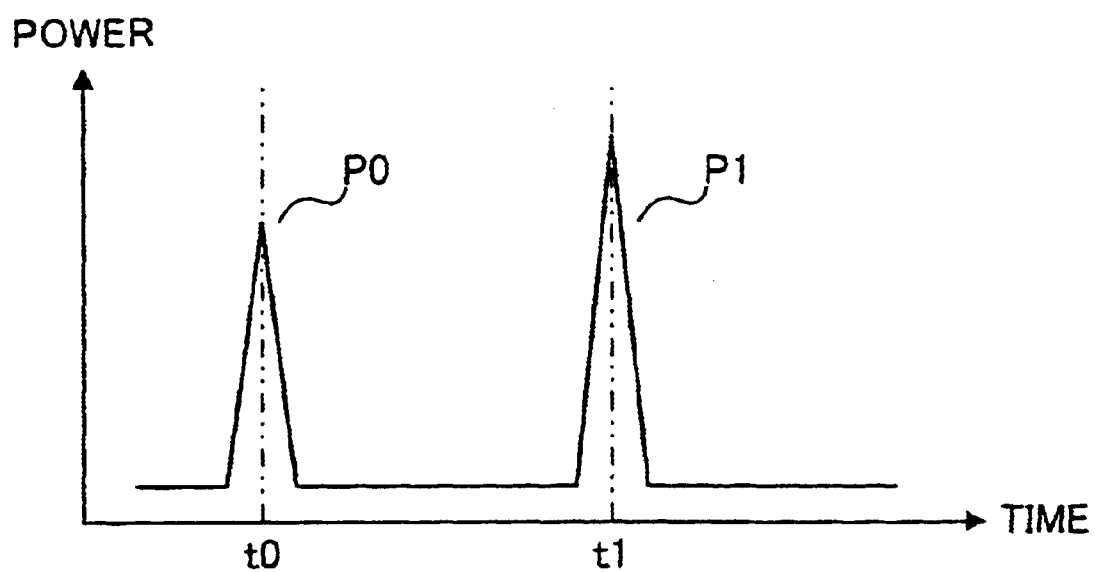
FIG. 4 is an example of a delay profile measurement result.

FIG. 4 illustrates an example of the delay profile measurement result. In FIG. 4, the horizontal axis expresses the time and vertical axis expresses power. In a radio communication, there is not only a direct wave, which is a transmission signal directly arriving at the receiving side but also a delay wave arriving after being reflected by mountains and buildings, etc. FIG. 4 shows that a direct wave signal of power p0 arrives at time t0 and a delay wave signal of power p1 arrives at time t1.

Timing detection circuit 111 detects the time at which a signal arrives from a delay profile and considers the signal that arrives first among the detected signals as a direct wave signal and outputs the information about the time at which the direct wave signal has arrived to selection circuits 112 to 114 and position detection circuit 116.

Selection circuits 112 to 114 outputs the direct wave signals output from matched filters 107 to 109 to direction of arrival estimator 115 based on the information output from timing detection circuit 111.

Direction of arrival estimator 115 estimates the direction of arrival of the reception signal from the output signals of selection circuits 112 to 114, detects the direction angle between the own station and terminal apparatus and outputs the information on the detected direction angle to position detection circuit 116.

Position detection circuit 116 measures a propagation delay from the information on the time at which the direct wave signal has arrived and timing offset information and calculates the distance between the own station and terminal apparatus. Then, position detection circuit 116 outputs terminal position information indicating the distance between the own station and terminal apparatus and the direction angle to a central control station, which is not shown in the figure.

Antenna duplexer 152 allows a same antenna to be used for both transmission and reception and outputs a signal received by radio by antenna 151 to the reception RF section 153 and outputs a transmission signal output from transmission RF section 165 to antenna 151.

Reception RF section 153 amplifies the reception signal input from antenna duplexer 152 and converts its frequency to an intermediate frequency or baseband frequency and outputs the signal to matched filter 154. Matched filter 154 performs despreading by multiplying the output signal of reception RF section 153 by its specific spreading code and outputs the despread signal to delay profile measuring circuit 155 and selection circuit 157.

Delay profile measuring circuit 155 measures a delay profile of the output signal of matched filter 154 and outputs the measurement result to timing detection circuit 156. Timing detection circuit 156 detects the time at which the signal arrives from the delay profile and outputs the information on the time at which each detected signal has arrived to selection circuit 157.

Selection circuit 157 outputs the signal that arrives first among the output signals of matched filter 154 to channel estimator 158 as a direct wave signal and signals other the first arriving signal to channel estimator 159 as delay wave signals.

Channel estimator 158 performs channel estimation of the direct wave signal and outputs the channel-estimated value to RAKE combination circuit 160 and transmit power control circuit 162. Channel estimator 159 performs channel estimation of the delay wave signals and outputs the channel-estimated values to RAKE combination circuit 160 and connection switch 161.

RAKE combination circuit 160 corrects phase or amplitude variations due to fading by multiplying the direct wave signal by a complex conjugate of the channel-estimated value of channel estimator 157 and multiplying the delay wave signals by a complex conjugate of the channel-estimated value of channel estimator 158. Then, RAKE combination circuit 160 demodulates the corrected signals through RAKE combination and outputs the reception data to the central control station, which is not shown in the figure, and outputs a power control command to transmission RF section 165.

Connection switch 161 controls whether or not to output the delay wave signals and channel-estimated value of channel estimator 159 to transmit power control circuit 162 based on a control signal from the central control station, which is not shown in the figure.

Transmit power control circuit 162 corrects phase and amplitude variations of the input signals due to fading and then combines the signals and measures the level of reception power. If the measurement result falls below the target quality, transmit power control circuit 162 generates a power control command to increase the transmit power of the next uplink signal and otherwise generates a power control command to increase the transmit power of the next uplink signal and outputs the generated power control command to multiplexing circuit 163.

Multiplexing circuit 163 multiplexes transmission data with the power control command output from transmit power control circuit 162 and outputs the multiplexed signal to modulation circuit 164. Modulation circuit 164 carries out primary modulation processing such as PSK and secondary modulation that multiplies specific spreading codes on the output signal of multiplexing circuit 163 and outputs the resulting signal to transmission RF section 165. Transmission RF section 165 carries out quadrature modulation and frequency conversion on the output signal of modulation circuit 164 and amplifies the output signal based on the power control command output from RAKE combination circuit 160 and transmits the signal by radio from antenna 151 via antenna duplexer 152.

Then, the signal flow in the position detection processing by the base station apparatus shown in FIG. 3 will be explained.

The signals received by antennas 101 to 103 are amplified by reception RF circuits 104 to 106 respectively and their frequency is converted to an intermediate frequency or baseband frequency. The output signals of reception RF sections 104 to 106 are despread by matched filters 107 to 109 using their specific spreading codes and output to delay profile measuring circuit 110 and selection circuits 112 to 114.

Delay profile measuring circuit 110 measures delay profiles of the output signals of matched filters 107 to 109 and timing detection circuit 111 detects the time at which each reception signal arrives and outputs the information on the time at which the direct wave signal, which is the first arriving signal among the detected signals, has arrived to selection circuits 112 to 114 and position detection circuit 116.

Then, the direct wave signals are output to direction of arrival estimator 115 via selection circuits 112 to 114 based on the information output from timing detection circuit 111.

Direction of arrival estimator 115 estimates the direction of arrival of the reception signal based on the direct wave signals, detects the direction angle of the terminal apparatus with respect to the own station and outputs information on the detected direction angle to position detection circuit 116.

Position detection circuit 116 measures a propagation delay from information on the times of arrival of the direct waves and timing offset information and calculates the distance between the own station and terminal apparatus. Then, the terminal position information indicating the distance and direction angle between the own station and terminal apparatus is output to the central control station, which is not shown in the figure.

Here, if the reception power of the uplink signal is not enough, timing detection circuit 111 may not be able to detect the time of arrival of the direct wave signal. In this case, the time of arrival of the delay wave signal is mistakenly detected as that of the direct wave, preventing the correct position of the terminal apparatus from being detected.

If the dispersion of the input terminal position information is greater than a threshold, the central control station decides that the reception quality has deteriorated preventing the correct position of the terminal apparatus from being detected. In this case, in order to increase transmit power of the uplink signal, the central control station sends a control signal to disconnect connection switch 161.

The signal flow in the transmission/reception processing including transmit power control of the base station apparatus shown in FIG. 3 will be explained below.

The signal received by antenna 151 is input to reception RF circuit 153 through antenna duplexer 152, amplified and its frequency converted to an intermediate frequency or baseband frequency by reception RF circuit 153. The output signal of reception RF circuit 153 is subjected to despreading processing using a specific spreading code by matched filter 154 and output to delay profile measuring circuit 155 and selection circuit 157.

Delay profile measuring circuit 155 measures the delay profile of the output signal of matched filter 154 and timing detection circuit 156 detects the time of arrival of each reception signal and the detected time of arrival of the signal is output to selection circuit 157.

Here, assuming that the signal arriving first of the detected signals is the direct wave signal and other signals are delay waves, the following processing is performed.

Based on the information output from timing detection circuit 156, the direct wave signal output from matched filter 154 is passed through selection circuit 157 and output to channel estimator 158, RAKE combination circuit 160 and transmit power control circuit 162. On the other hand, the delay wave signal output from matched filter 154 is passed through selection circuit 157 and output to channel estimator 159, RAKE combination circuit 160 and connection switch 161.

Channel estimator 158 subjects the direct wave signal to channel estimation and channel estimator 159 subjects the delay wave signal to channel estimation and both channel-estimated values are output to RAKE combination circuit 160.

Based on these channel-estimated values, RAKE combination circuit 160 corrects phase and amplitude variations due to fading and carries out RAKE combination and demodulation on each signal that has passed through selection circuit 157. Of the demodulated signals, the reception data is output to the central control station, which is not shown in the figure, and the transmit power control command is output to transmission RF section 165.

On the other hand, the delay wave signal output to connection switch 161 is output to transmit power control circuit 162 if connection switch 161 is connected by a control signal from the central control station.

In transmit power control circuit 162, each input signal is subjected to correction of phase and amplitude variations due to fading and combined and the reception power level of the combined signal is measured. If the measurement result falls below the target quality, a power control command to increase the transmit power of the next uplink signal is generated and otherwise a power control command to increase transmit power of the next uplink signal is generated and the generated power control command is output to multiplexing circuit 163.

That is, transmit power control circuit 162 normally connects connection switch 161 and performs transmit power control based on reception power of a signal combining direct wave and delay wave signals. Then, if position detection is correctly carried out, there is no need to increase transmit power of the uplink signal, and so transmit power control circuit 162 leaves switch 161 connected thereby reducing interference signals at other base station apparatuses. On the other hand, if position detection is not carried out correctly, transmit power control circuit 162 disconnects connection switch 161 and carries out transmit power control only based on reception power of direct wave signals. As a result, transmit power of the uplink signal is increased until the reception power of direct waves reaches the target quality, which makes it possible to improve the reception quality, correctly detect direct waves and perform correct position detection.

The transmission data of the downlink sent from the base station apparatus is multiplexed with the transmit power control command output from transmit power control circuit 162 by multiplexing circuit 163. The output signal of multiplexing circuit 163 is subjected to primary modulation processing such as PSK and secondary modulation processing with a specific spreading code multiplied by modulation circuit 164 and output to transmission RF section 165.

The output signal of modulation circuit 164 is subjected to quadrature modulation, frequency conversion, etc. by transmission RF circuit 165 and amplified based on the transmit power control command output from RAKE combination circuit 160, and sent by radio from antenna 151 via antenna duplexer 152.

As described above, the base station apparatus and transmit power control method of the present invention can perform transmit power control only based on the direct wave signals only when position detection is performed correctly, making reliable position detection compatible with reduction of interference in reception processing of signals of other stations.

In this embodiment, the central control station, which is not shown in the figure, decides whether position detection is carried out correctly and controls connection switch 161, but this processing can also be performed by position detection circuit 116.

Furthermore, in this embodiment, RAKE combination circuit 160 performs RAKE combination only using the output of selection circuit 157, but it is also possible to perform RAKE combination using the outputs of selection circuits 112 to 114 in addition to the output of selection circuit 157.

This application is based on the Japanese Patent Application No. HEI 10-336110 filed on Nov. 26, 1998, entire content of which is expressly incorporated by reference herein.

What is claimed is:

1. A base station apparatus comprising:

a position detector that detects the position of a terminal apparatus in communication;

a reception signal extractor that extracts direct wave signals and delay wave signals;

a signal passage controller that controls whether or not to allow the extracted delay wave signals to pass based on the detection result of said position detecting means; and a transmit power controller that controls transmit power based on reception power combining the direct wave signals and the delay wave signals that have passed through said signal passage controller.

2. The base station apparatus according to claim 1, wherein the signal passage controller intercepts the delay wave signals if the position of the terminal apparatus in communication cannot be detected correctly.

3. A transmit power control method of a base station that controls transmit power based on reception power of direct wave signals if the position of a terminal apparatus in communication cannot be detected correctly, and otherwise controls transmit power based on reception power of a signal combining the direct wave signals and delay wave signals.

* * * * *